United States Patent
Wiesendanger et al.

(10) Patent No.: US 6,417,316 B1
(45) Date of Patent: Jul. 9, 2002

(54) CURABLE EPOXY RESIN COMPOSITIONS

(75) Inventors: Rolf Wiesendanger, Riehen; Walter Fischer, Reinach, both of (CH)

(73) Assignee: Vantico Inc., Brewster, NY (US)

( * ) Notice: Subject to any disclaimer, the term of this patent is extended or adjusted under 35 U.S.C. 154(b) by 0 days.

(21) Appl. No.: 09/421,166

(22) Filed: Oct. 19, 1999

(30) Foreign Application Priority Data

Oct. 22, 1998 (CH) .............................................. 2137/98

(51) Int. Cl.$^7$ ..................... C08G 59/68; C08G 65/10; C08L 63/02
(52) U.S. Cl. ..................... 528/92; 523/410; 523/428; 525/526; 525/939; 528/88
(58) Field of Search ................... 528/92, 88; 523/410, 523/428; 525/526, 939

(56) References Cited

U.S. PATENT DOCUMENTS

| | | | | |
|---|---|---|---|---|
| 3,018,262 A | * | 1/1962 | Schroeder | 528/92 X |
| 3,231,586 A | | 1/1966 | Tinsley | |
| 3,300,415 A | | 1/1967 | Ward | |
| 3,907,706 A | * | 9/1975 | Robins | 528/92 X |
| 4,026,858 A | * | 5/1977 | Andrews et al. | 528/92 X |
| 4,540,769 A | * | 9/1985 | Dobinson et al. | 528/92 X |
| 4,957,946 A | * | 9/1990 | Meier et al. | 528/92 X |
| 5,362,835 A | * | 11/1994 | Rolfe et al. | 528/92 X |
| 5,854,313 A | * | 12/1998 | Omori et al. | 523/410 X |
| 5,908,901 A | | 6/1999 | White | 525/438 |

FOREIGN PATENT DOCUMENTS

| | | | | |
|---|---|---|---|---|
| EP | 0493916 | | 7/1992 | |
| JP | 403275781 | * | 12/1991 | 523/428 |
| WO | WO 95/17445 | | 6/1995 | |

* cited by examiner

*Primary Examiner*—Richard D. Lovering
(74) *Attorney, Agent, or Firm*—Lyon & Lyon LLP

(57) ABSTRACT

Curable epoxy resin compositions, which are obtainable by heating a composition containing at least one epoxy compound, which contains on average at least one, preferably more than one, 1,2-epoxy group and optionally also one or several hydroxyl groups in the molecule, in the presence of at least one Lewis acid as catalyst, wherein the Lewis acid is a salt of trifluoromethanesulfonic acid or of perchloric acid, the counterion of which carries a 2- to 6-fold positive charge, until the epoxy value, measured in equivalent epoxy/kg (Eq/kg) of the starting material, has been reduced by 1 to 60 percent, preferably by 5 to 50 percent; a process for their preparation, and their use for the preparation of fully cured moulded compositions or coatings. Claimed are, inter alia, also high molecular weight epoxy compounds of formula (IIa)

(IIa)

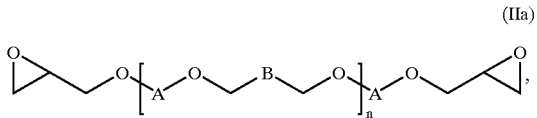

wherein A is a divalent aliphatic or aromatic radical, B is the radical of the dioxan, which is substituted either in 2- and 5-position or in 2- and 6-position and which may be in the cis- or trans-form, and n is an integer from 1 to 10, preferably from 1 to 5.

24 Claims, No Drawings

CURABLE EPOXY RESIN COMPOSITIONS

The present invention relates to curable epoxy resin compositions, which are obtainable by heating a composition containing at least one epoxy compound, which contains on average at least one, preferably more than one, 1,2-epoxy group and optionally also one or several hydroxyl groups in the molecule, in the presence of at least one specific Lewis acid as catalyst. Such an epoxy resin composition mixture contains both the monomeric starting compound and high molecular weight epoxy compounds formed from the starting compound during heating.

Mixtures which are curable by thermosetting, for example two-component systems, and which contain an epoxy resin, i.e. an epoxy compound, which preferably contains on average more than one 1,2-epoxy group in the molecule, as well as a suitable hardener, are known. Thus, for example, epoxy resins containing on average two or more epoxy groups in the molecule are reacted or crosslinked with amino group-containing compounds (hardeners) in the absence or presence of suitable catalysts. After crosslinking or curing, such mixtures (EP-resins) yield cured products having different properties depending on the amount of the individual components used. Casting compositions, primary adhesives and thin coatings prepared from such per se known epoxy resins generally have the disadvantage that they are attacked within a short time by weathering and light. Coatings produced from such products usually turn dull, yellow and chalky very quickly.

Surprisingly, it has now been found that the performance properties of fully cured EP-resins are markedly improved if the epoxy compound is heated in the presence of a specific Lewis acid prior to being mixed with the hardener, the epoxy compound polymerising in part in an addition reaction, an epoxy resin composition being thus obtained which contains both the monomeric starting compound and the high molecular weight epoxy compounds formed during heating. It has also been found that the epoxy resin composition thus obtained can also be fully cured without any hardener being added, and that identically improved product properties can be obtained. In addition, it has been found that according to this invention the epoxy resins used can be epoxy compounds which contain in the same molecule at least one 1,2-epoxy group as well as one or several hydroxyl groups.

The present invention is defined in the patent claims. This invention relates in particular to curable epoxy resin compositions which are obtainable by heating a composition containing at least one epoxy compound, which contains on average at least one 1,2-epoxy group and optionally also one or several hydroxyl groups in the molecule, in the presence of at least one specific Lewis acid until the epoxy resin content, measured in equivalent epoxy/kg (Eq/kg) of the starting material, has been reduced by 1 to 60 percent, preferably by 5 to 50 percent. The Lewis acid is then preferably deactivated with a deactivator (quencher) in order to increase the storability of the epoxy resin composition obtained. The epoxy compound preferably contains at least two 1,2-epoxy groups.

This invention also relates to a process for the preparation of the novel curable epoxy resin compositions, which comprises heating a composition containing at least one epoxy compound which contains on average at least one or several 1,2-epoxy groups and optionally also one or several hydroxyl groups in the molecule, in the presence of at least one specific Lewis acid until the epoxy resin content has been reduced by 1 to 60 percent, preferably by 5 to 50 percent, and deactivating the Lewis acid with a deactivator, if required.

This invention furthermore relates to the use of the novel curable epoxy resin compositions for the preparation of fully cured moulded compositions or coatings (i) singly (homopolymerisation) or (ii) in admixture with at least one hardener in a heat-curable thermoset multicomponent system. This invention also relates to moulded compositions and coatings prepared in this manner.

In another of its aspects, this invention relates to heat-curable thermoset multicomponent systems comprising an epoxy resin composition curable in accordance with this invention.

This invention also relates to a divided package, the one part of which contains the epoxy resin composition curable according to this invention and the other part contains a suitable hardener.

This invention furthermore relates to the novel high molecular weight epoxy compounds which are formed while the epoxy compounds used as starting product are being heated.

Epoxy resins suitable for use in the process for obtaining the curable mixtures are the epoxy resins conventionally used in the epoxy resin technology. Examples of epoxy resins are:

I) Polyglycidyl- and poly(β-methylglycidyl)esters, obtainable by reacting a compound containing at least two carboxyl groups in the molecule with epichlorohydrin or β3-methylepichlorohydrin. Possible compounds containing at least two carboxyl groups in the molecule may be aliphatic polycarboxylic acids. Examples of such polycarboxylic acids are oxalic acid, succinic acid, glutaric acid, adipic acid, pimelic acid, sebacic acid, subaric acid, azelaic acid or dimerised or trimerised linoleic acid. It is also possible to use cycloaliphatic polycarboxylic acids, for example tetrahydrophthalic acid, 4-methyltetrahydrophthalic acid, hexahydrophthalic acid or 4-methylhexahydrophthalic acid. Aromatic polycarboxylic acids may also be used, for example phthalic acid, isophthalic acid, terephthalic acid, trimellitic or pyromellitic acid. It is preferred to use reaction products of acids containing two carboxyl groups in the molecule with epichlorohydrin and/or β-methylepichlorohydrin.

II) Polyglycidyl- or poly(β-methylglycidyl)ethers, obtainable by reacting a compound containing at least two free alcoholic hydroxyl groups and/or phenolic hydroxyl groups under alkaline conditions or in the presence of an acid catalyst with subsequent treatment with alkali. The glycidyl ethers of this type are derived, for example, from acyclic alcohols, such as from ethylene glycol, diethylene glycol and higher poly(oxyethylene)glycols, propane-1,2-diol or poly(oxypropylene)glycols, propane-1,3-diol, butane-1,4-diol, poly(oxytetramethylene)-glycols, pentane-1,5-diol, hexane-1,6-diol, hexane-2,4,6-triol, glycerol, 1,1,1-trimethylolpro-pane, pentaerythritol, sorbitol, and from polyepichlorohydrins. They are also derived, for example, from cycloaliphatic alcohols, such as 1,4-cyclohexanedimethanol, bis(4-hydroxy-cyclohexyl)methane or 2,2-bis(4-hydroxycyclohexyl)propane. The glycidyl ethers can also be derived from mononuclear phenols, for example from resorcinol or hydroquioone, or they are based on polynuclear phenols, such as bis(4-hydroxyphenyl)methane, 4,4'-dihydroxy-biphenyl, bis(4-hydroxyphenyl)sulfone, 1,1,2,2-tetrakis(4-hydroxyphenyl)ethane, 2,2-bis(4-hydroxyphenyl)propane, 2,2-bis(3,5-dibromo-4-hydroxyphenyl)propane and on novolaks, obtainable by condensation of aldehydes, such as formaldehyde, acetaldehyde, chloral or furfuraldehyde, with phenols, such as phenol, or with phenols which are substituted in the nucleus by chlorine atoms or $C_1$–$C_9$alkyl groups, for example 4-chlorophenol, 2-methylphenol, or 4-tert-butylphenol, or by condensation with bisphenols, such as those of the type mentioned above. It is preferred to use reaction products of compounds containing two free alcoholic hydroxyl groups and/or phenolic hydroxyl groups with epichlorohydrin and/or β-methylepichlorohydrin.

III) Poly(N-glycidyl)compounds, obtainable by dehydrochlorination of the reaction products of epichlorohydrin with amides or imides, which contain at least two amide or imide hydrogen atoms. These amides or imides are, for example, triglycidylisocyanurate, N,N'-diglycidyl derivatives of cycloalkylene ureas, such as ethylene urea or 1,3-propylenurea, and diglycidyl derivatives of hydantoins, such as of 5,5-dimethylhydantoin. It is preferred to use reaction products of amides or imides containing two reactive amine hydrogen atoms with epichlorohydrin and/or β-methylepichlorohydrin.

IV) Poly(S-glycidyl)compounds, for example di-S-glycidyl derivatives derived from dithiols, such as ethane-1,2-dithiol or bis(4-mercaptomethylphenyl) ether.

V) Cycloaliphatic epoxy resins, for example bis-2,3-epoxycyclopentyl)ether, 2,3-epoxy-cyclopentyl glycidyl ether, 1,2-bis(2,3-epoxycyclopentyloxy)ethane or 3,4-epoxycyclohexyl-methyl-3',4'-epoxycyclohexanecarboxylate, 1,4-bis (hydroxymethyl)cyclohexane diglycidyl ether, hydrogenated diglycidyl ether of bisphenol A, bis (hydroxymethyl)tricyclodecane diglycidyl ether.

However, it is also possible to use epoxy resins in which the 1,2-epoxy groups are bound to different heteroatoms or functional groups. These compounds include, for example, the glycidyl ether-glycidyl ester of salicylic acid, N-glycidyl-N'-(2-glycidyloxypropyl)-5,5-dimethyl-hydantoin or 2-glycidyloxy-1,3-bis(5,5-dimethyl-1-glycidylhydantoin-3-yl)propane, those compounds which contain two epoxy groups being preferred in each case.

The epoxy resin preferably used in the curable mixtures of this invention is a liquid or viscous polyglycidyl ether or polyglycidyl ester. Aromatic diglycidyl ethers are particularly preferred, for example resins of bisphenol A or bisphenol F.

It is also particularly preferred to use the aliphatic 1,4-bis(hydroxymethyl)cyclohexane diglycidyl ether, hydrogenated diglycidyl ether of bisphenol A, 1,4-butanediol diglycidyl ether, 1,6-butanediol diglycidyl ether and bis (hydroxymethyl)tricyclodecane diglycidyl ether.

VI) Compounds containing in addition to the 1,2-epoxy group a hydroxyl group contain on average one to two epoxy groups each and one or several, preferably one, hydroxyl group in the molecule. Examples of such compounds are monoglycidyl ethers of diols and biphenols, diglycidyl ethers of triols and triphenols. The aliphatic compounds and, in particular, the cycloaliphatic compounds are preferred.

The composition to be heated to an elevated temperature according to this invention is essentially free of non-aminic hardeners. This means that the composition contains no more than five weight percent of hardener, preferably no more than one weight percent and, particularly preferably, no hardener.

It has been found that in the context of epoxy resins specific Lewis acids are surprisingly catalysing the cyclodimerisation of epoxy groups to 1,4-dioxan units

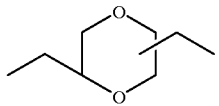

instead of the well-known adducts

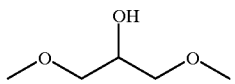

as known from Lewis acids such as of the $BF_3$ type or $SnCl_2$. Lewis acids (catalysts) leading to 1,4-dioxane groups in the backbone of the resin are, for example, the salts of trifluoromethanesulfonic acid and perchloric acid with counterions carrying a 2- to 6-fold positive charge. These Lewis acids are preferably from the groups 2–15 (IUPAC format 1989) of the Periodic Table and from the lanthanides, preferably from the groups 3, 6–8, 11, 12, 14 and from the lanthanides. Most preferred are the 2-valent, 3-valent or 4-valent cations of copper (Cu), zinc (Zn), tin (Sn), scandium (Sc), yttrium (Y), ytterbium (Yb), lanthanum (La), manganese (Mn), lead (Pb), iron (Fe), chromium (Cr) and mercury (Hg).

The concentration of the catalyst in the reaction mixture depends on its reactivity, on the desired cycle time, the temperature, the educts and on the solubility in the reaction mixture. Typical concentrations are in the range from 10 ppm to 10,000 ppm, preferably from 100 ppm to 3,000 ppm.

As soon as the reaction has reached the desired reaction degree with respect to the epoxy groups, the warmed mixture is charged with suitable catalyst-inhibiting compounds (quenchers), preferably at reaction temperature. The novel epoxy resin compositions thus become storage-stable. Where appropriate, the advanced epoxy resin composition thus obtained can then be mixed with non-advanced epoxy resin to give a mixture having the desired epoxy value.

The quenchers used can be bases, such as alkali metal hydroxides and alkaline earth metal hydroxides, for example sodium hydroxide or potassium hydroxide, alcoholates, for example sodium methylate or sodium ethylate, sodium-t-butylate and other alcoholates, carboxylates, for example sodium acetate, primary, secondary or tertiary amines, for example butylamine, piperidines and triethylamine, amino alcohols, for example triethanolamine, cyanides, for example potassium cyanide, sodium cyanide, nitrites, for example acetonitriles, amides, for example N-methylpyrrolidone, urethanes, for example reaction products of alcohols with phenylisocyanate and/or other per se known isocyanates. Preferred quenchers are alkaline earth metal hydroxides and lactams and, in particular, tertiary amines. The amount of quencher used depends on its specific inhibiting effect on the catalyst used, on its reactivity to the epoxy compounds used and on the high molecular weight compounds formed according to this invention. The skilled person knows how to select and optimise the quencher added and how to determine the optimum amount used. Equivalent to slightly excess (1 to 20 vals) amounts are typically added to the catalyst for neutralisation. These amounts depend on the type of catalyst and quencher and need to be optimised in each case.

In the process for the preparation of the novel above-defined curable epoxy resin composition, the composition comprising the epoxy compound and the catalyst is heated, preferably in a reactor, to a temperature in the range from 20° C. to 200° C., more preferably from 40° C. to 180° C. and, most preferably, from about 100° C. to 150° C. In the course of this process the epoxy content of the mixture is analytically determined continuously or in suitable intervals, heating being continued until the epoxy content has been reduced by 1 to 60 percent, preferably by 5 to 50 percent, relative to the starting content. The Lewis acid is then preferably deactivated with a deactivator. Analysis can be carried out by methods known per se, for example by reacting the oxirane with hydrogen bromide (HBr) which is formed in situ from tetraethyl ammonium bromide and $HClO_4$. Heating can be carried out solventless or in the presence of suitable inert solvents which are adjusted to the reaction temperature. Such solvents are, for example, aromatic hydrocarbons, ethers, esters, aliphatic hydrocarbons and, preferably, aromatic hydrocarbons, such as xylene or toluene.

Monoepoxy compounds can dimerise as follows when heated in an addition reaction in the presence of the cited catalysts (Lewis acids) to the indicated temperatures:

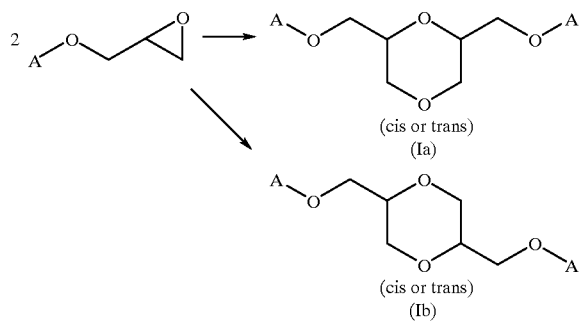

(cis or trans)
(Ia)

(cis or trans)
(Ib)

In the above reaction scheme (I), A is a monovalent aliphatic or aromatic radical.

If the epoxy compounds contain two epoxy groups, then polymer formation proceeds as follows under the cited conditions:

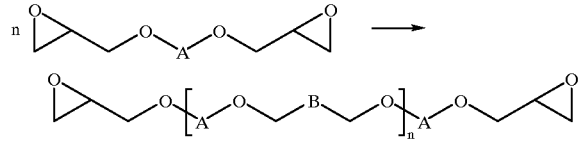

(II)

In this reaction scheme (II), A is a divalent aliphatic or aromatic radical, B is the radical of dioxan, which is substituted either in 2- and 5-position or in 2- and 6-position and which may be in the cis- or trans-form. n is an integer from 1 to 10, preferably from 1 to 5. Analyses have shown that the novel epoxy resin compositions, obtained in accordance with this invention by treating a composition comprising an epoxy compound containing on average two 1,2-epoxy groups, contain substantial proportions, i.e. about 5 to 90 percent, of compounds of formula (IIa) as high molecular weight epoxy compounds which can be isolated by methods known per se.

Accordingly, this invention relates to compounds of formula (IIa)

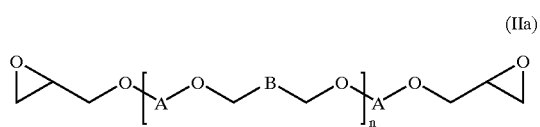

(IIa)

wherein A, B and n have the meanings given in the above reaction scheme (II). A is preferably hydrocarbon radicals of di- or triols, bi- or tris-phenols, more preferably hydrocarbon radicals of linear or branched aliphatic or cycloaliphatic polyols, most preferably hydrocarbon radicals of cycloaliphatic polyols. n is preferably 1 to 10, more preferably 1 to 5. The compounds of formula (IIa) can also be in slightly branched form.

If the epoxy compound contains a hydroxyl group in the starting mixture, as described above, then that group can react with the epoxy group according to the reaction scheme (III).

Reaction scheme (III)

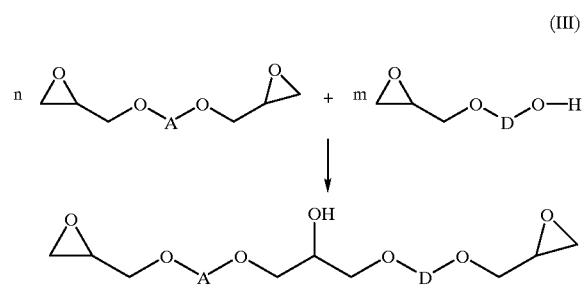

(III)

wherein A and D have each independently of the other one of the meanings given for A. Parallel to the dimerisation reaction of the epoxy group with formation of a substituted dioxan radical, a reaction according to reaction scheme (IV) also takes place in this instance. The high molecular weight compounds formed in this reaction conform to formula (IV):

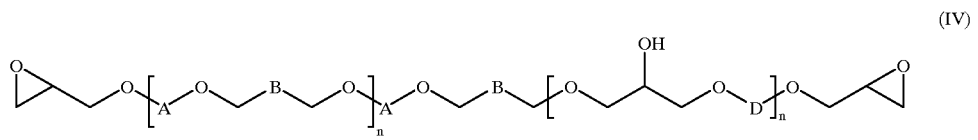

(IV)

wherein A, B and D have the meanings given above and n are each independently of the other 1 to 5.

The compounds of formula (IV) formed in this manner are also a subject matter of this invention. The individual units in the brackets are in any sequence and in any arrangement in the molecule. The compounds of formula (IV) can also be in slightly branched form.

The epoxy compounds (i.e. composition) used as starting material are known and some are commercially available. It is also possible to use mixtures of epoxy resins in any ratios of each other. For the subsequent cure step all conventional hardeners for epoxy resins can be used, for example amines, carboxylic acids, carboxylic acid anhydrides or phenols. Catalytic hardeners can also be used, such as imidazoles. Such hardeners are described, inter alia, in H.Lee, K. Neville, Handbook of Epoxy Resins, McGraw Hill Book Company, 1982. The amount of hardener used depends on the chemical nature of the hardener and on the desired properties of the curable mixture and of the cured product. The skilled person can easily determine the maximum amount, in particular on the basis of stoichiometric calculations. The mixture can be prepared in customary manner by mixing the components via stirring by hand or by means of known mixing units, for example by means of agitators, kneaders or rolls. Depending on the application, the customary additives may be added to the mixtures, for example fillers, pigments, colourants, flow control agents or plasticisers. The novel EP-resins can be marketed in a manner known per se as two-component systems.

The following Examples illustrate the invention.

EXAMPLE 1

(Preparation of the advanced diglycidyl ether)

50 Equivalents of 1,4-bis-hydroxymethylcyclohexane diglycidyl ether are heated in the presence of 0.05 equivalents of zinc triflate to a temperature in the range from 80 to 120° C. over 3 to 10 hours. The reaction can be carried out (i) in solution, for example in xylene (50% by weight of xylene based on the total weight of all components) or (ii) solventless. The reaction is checked by determining the epoxy concentration and is kept going (advanced) until the initial epoxy value of 6.5 oxirane equivalents/kilogramme (Eq/kg) has been reduced to 4.0 Eq/kg.

EXAMPLE 2 a) The 1,4-bis-hydroxymethylcyclohexane diglycidyl ether advanced in accordance with Example 1 is mixed on a 3-roll mill with titanium dioxide ($TiO_2$), from which mixture a corresponding TiO2-containing masterbatch is prepared ($TiO_2$ content: 50%). 250 Parts of this masterbatch are charged with 250 parts of 1,4-bis-hydroxymethy (cyclohexane diglycidyl ether homopolymer so that an advanced diglycidyl ether mixture is obtained having an oxirane content of 3.0 Eq/kg. Subsequently, an equinormal amount of isophorone diamine (IPD) is added and thorough mixing is carried out.

b) Films on aluminium sheets are prepared from the curable mixture obtained in paragraph a) using a 200 μm spiral applicator. These films are cured for 10 days at 20° C. and 50% relative humidity in a conditioned room and are then exposed to natural and artificial weathering, respectively.

c) Comparison test: The test described in this Example 2, paragraph b) is repeated, with the proviso that the mixture of paragraph a) is replaced by non-advanced 1,4-bis-hydroxymethylcyclohexane diglycidyl ether. The results are compiled in Table 1.

EXAMPLE 3 a) The 1,4-bis-hydroxymethylcyclohexane diglycidyl ether advanced in accordance with Example 1 is mixed on a 3-roll mill with titanium dioxide, from which mixture a corresponding $TiO_2$-containing masterbatch ($TiO_2$ content: 50%) is prepared. 250 Parts of this masterbatch are charged with 250 parts of 1,4-bis-hydroxymethylcyclohexane diglycidyl ether homopolymer so that an advanced diglycidyl ether mixture is obtained having an oxirane content of 3.0 Eq/kg. Subsequently, an equinormal amount of trimethylhexamethylenediamine (TMD) is added and thorough mixing is carried out.

b) Films are prepared from the curable mixture obtained in paragraph a) according to Example 2, paragraph b), which are cured for 10 days in a conditioned room and then exposed to natural and artificial weathering, respectively.

c) Comparison test: The test described in this Example 3, paragraph b) is repeated, with the proviso that the mixture of paragraph a) is replaced by non-advanced 1,4-bis-hydroxymethylcyclohexane diglycidyl ether. The results are compiled in Table 1.

TABLE 1

|  | Example 2, paragraph c | Example 3, paragraph c | Example 2, paragraph b | Example 3, paragraph b |
|---|---|---|---|---|
| gloss (initial value) | 60 to 90 | 91 | 92 | 92 |
| gloss after 500 h WOM | 10 | 40 to 70 | 90 | 78 |
| gloss after one month outdoor weathering | 10 | 5 | 89 | 63 |

WOM signifies Weather-O-meter and the skilled person is familiar with it. Outdoor weathering: One set of coated sheets is exposed to weathering on the roof of the building.

What is claimed is:

1. A curable epoxy resin composition, which is obtainable by heating a composition free of non-aminic hardeners and containing at least one epoxy compound, which contains on average at least one 1,2-epoxy group and optionally also one or several hydroxyl groups in the molecule, in the presence of at least one Lewis acid as catalyst, wherein the Lewis acid is a salt of trifluoromethanesulfonic acid or of perchloric acid, the counterion of which carries a 2- to 6-fold positive charge, until the epoxy content, measured in equivalent epoxy/kg (Eq/kg) of the starting material, has been reduced by 1 to 60 percent.

2. A curable epoxy resin composition according to claim 1, wherein the Lewis acid is subsequently deactivated with a deactivator (quencher).

3. A curable epoxy resin composition according to claim 1, wherein the epoxy compound contains at least two 1,2-epoxy groups.

4. A curable epoxy resin composition according to claim 1, wherein the epoxy compound is a liquid or viscous polyglycidyl ether or polyglycidyl ester.

5. A curable epoxy resin composition, which is obtainable by heating a composition essentially free of non-aminic hardeners and containing at least one epoxy compound, which contains on average at least one 1,2-epoxy group and optionally also one or several hydroxyl groups in the molecule, in the presence of at least one Lewis acid as catalyst, wherein the Lewis acid is a salt of trifluoromethanesulfonic acid or of perchloric acid, the counterion of which carries a 2- to 6-fold positive charge, until the epoxy content, measured in equivalent epoxy/kg (Eq/kg) of the starting material, has been reduced by 1 to 60 percent, wherein the epoxy compound is an aliphatic 1,4-bis(hydroxymethyl)cyclohexane diglycidyl ether, a hydrogenated diglycidyl ether of bisphenol A, 1,4-butanediol diglycidyl ether, 1,6- butanediol diglycidyl ether and/or a bis(hydroxymethyl)tricyclodecane diglycidyl ether.

6. A curable epoxy resin composition, which is obtainable by heating a composition essentially free of non-aminic hardeners and containing at least one epoxy compound, which contains on average at least one 1,2-epoxy group and optionally also one or several hydroxyl groups in the molecule, in the presence of at least one Lewis acid as catalyst, wherein the Lewis acid is a salt of trifluoromethanesulfonic acid or of perchloric acid, the counterion of which carries a 2- to 6-fold positive charge, until the epoxy content, measured in equivalent epoxy/kg (Eg/kg) of the starting material, has been reduced by 1 to 60 percent, wherein the epoxy compound contains on average one to two epoxy groups and one or several hydroxyl group in the molecule.

7. A curable epoxy resin according to claim 6, wherein the epoxy compound contains one hydroxyl group in the molecule.

8. A curable epoxy resin according to claim 1, wherein the Lewis acid is a salt of trifluoromethanesulfonic acid or of perchloric acid, the counterion of which carries a 2- to 6-fold positive charge, is selected from the group consisting of the groups 2–15 (IUPAC format 1989) of the Periodic Table and the lanthanides.

9. A curable epoxy resin composition according to claim 1, wherein the epoxy compound is an aromatic diglycidyl ether.

10. A curable epoxy resin composition according to claim 1, wherein the epoxy compound is an epoxy resin of bisphenol A or bisphenol F.

11. A curable epoxy resin according to claim 1, wherein the Lewis acid is a salt of trifluoromethanesulfonic acid or of perchloric acid, the counterion of which carries a 2- to 6-fold positive charge is selected from the group consisting of the groups 3, 6–8, 11, 12, 14 (IUPAC format 1989) and the lanthanides.

12. A curable epoxy resin according to claim 1, wherein the Lewis acid is a salt of trifluoromethanesulfonic acid or of perchloric acid, the counterion of which carries a 2- to 6-fold positive charge, is selected from the group consisting of the 2-valent, 3-valent or 4-valent cations of copper (Cu), zinc (Zn), tin (Sn), scandium (Sc), yttrium (Y), ytterbium (Yb), lanthanum (La), manganese (Mn), lead (Pb), iron (Fe), chromium (Cr) and mercury (Hg).

13. A heat-curable thermoset multicomponent system for the preparation of fully cured moulded compositions or coatings, which comprises a curable epoxy resin composition according to claim 1 singly or in admixture with at least one hardener.

14. The moulded composition or coating prepared according to claim 13.

15. A heat-curable thermoset multicomponent system, which comprises a curable epoxy resin composition according to claim 1.

16. A divided package having at least a first part and a second part, wherein the first part contains a curable epoxy resin composition and the second part contains a suitable hardener, wherein the curable epoxy resin composition is obtainable by heating a composition essentially free of non-aminic hardeners and containing at least one epoxy compound, which contains on average at least one 1,2-epoxy group and optionally also one or several hydroxyl groups in the molecule, in the presence of at least one Lewis acid as catalyst, wherein the Lewis acid is a salt of trifluoromethanesulfonic acid or of perchloric acid, the counterion of which carries a 2- to 6-fold positive charge, until the epoxy content, measured in equivalent epoxy/kg (Eg/kg) of the starting material, has been reduced by 1 to 60 percent.

17. A curable epoxy resin composition according to claim 1 wherein the epoxy content, measured in equivalent epoxy/kg (Eq/kg), of the starting material, has been reduced by 5 to 50 percent.

18. A process for the preparation of the curable epoxy resin composition according to claim 1, which comprises heating a composition containing at least one epoxy compound which contains on average at least one or several 1,2-epoxy groups and optionally also one or several hydroxyl groups in the molecule, in the presence of at least one Lewis acid as catalyst, wherein the Lewis acid is a salt of trifluoromethanesulfonic acid or of perchloric acid, the counterion of which carries a 2- to 6-fold positive charge, until the epoxy resin content has been reduced to 1 to 60 percent relative to the starting content, and deactivating the Lewis acid with a deactivator, if required.

19. A process according to claim 18, wherein the epoxy resin content is reduced by 5 to 50 percent relative to the starting content.

20. A high molecular weight epoxy compound of formula (IIa)

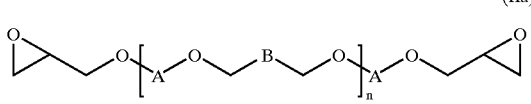

(IIa)

wherein A is a divalent aliphatic or aromatic radical, B is the radical of dioxan which is substituted either in 2- and 5-position or in 2- and 6-position and which may be in the cis- or trans-form, and n is an integer from 1 to 10.

21. A high molecular weight epoxy compound according to claim 20, wherein A is a hydrocarbon radical of a di- or trio or bi- or trisphenol.

22. A high molecular weight epoxy compound according to claim 20, wherein A is a hydrocarbon radical of linear or branched aliphatic or cycloaliphatic polyol.

23. A high molecular weight epoxy compound according to claim 20, wherein A is a hydrocarbon radical of a cycloaliphatic polyol.

24. A high molecular weight epoxy compound of formula (IV):

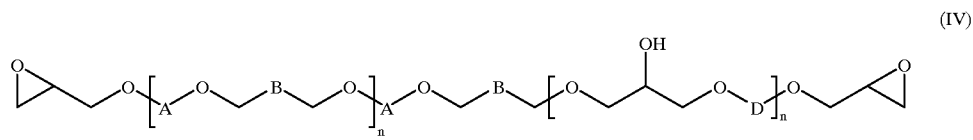

(IV)

wherein A and B have the meanings cited in claim 20, D is independently a divalent aliphatic or aromatic radical, and n is each independently of the other 1 to 5, the units in the brackets being in any sequence and in any arrangement in the molecule.

* * * * *